(12) United States Patent
Hsu et al.

(10) Patent No.: US 10,783,824 B2
(45) Date of Patent: Sep. 22, 2020

(54) DRIVE CIRCUIT, DISPLAY PANEL, DISPLAY DEVICE, AND METHOD FOR DRIVING THE DISPLAY PANEL

(71) Applicants: Chongqing BOE Optoelectronics Technology Co., Ltd., Chongqing (CN); BOE Technology Group Co., Ltd., Beijing (CN)

(72) Inventors: Yihjen Hsu, Beijing (CN); Xiuqin Zhang, Beijing (CN); Lijun Xiao, Beijing (CN); Shaohong Gao, Beijing (CN); Zhiyou Liu, Beijing (CN); Yanan Zhao, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/390,538

(22) Filed: Apr. 22, 2019

(65) Prior Publication Data

US 2020/0098311 A1 Mar. 26, 2020

(30) Foreign Application Priority Data

Sep. 25, 2018 (CN) .......................... 2018 1 1115436

(51) Int. Cl.
*G09G 3/3225* (2016.01)
*G06F 1/06* (2006.01)
*G09G 3/36* (2006.01)

(52) U.S. Cl.
CPC .............. *G09G 3/3225* (2013.01); *G06F 1/06* (2013.01); *G09G 3/3648* (2013.01); *G09G 2310/0286* (2013.01); *G09G 2310/08* (2013.01)

(58) Field of Classification Search
CPC ....... G09G 2310/0286; G09G 2310/08; G09G 2310/0205; G09G 2310/0218; G09G 2310/0267; G09G 2310/067; G09G 3/3266; G09G 3/3674; G11C 19/28; G11C 19/184; G11C 19/00; G11C 19/287
See application file for complete search history.

(56) References Cited

U.S. PATENT DOCUMENTS

2018/0158393 A1* 6/2018 Woo ..................... G09G 3/2014

\* cited by examiner

*Primary Examiner* — Sanjiv D. Patel
(74) *Attorney, Agent, or Firm* — Arent Fox LLP; Michael Fainberg (57) ABSTRACT

The disclosure discloses a drive circuit, a display panel, a display device, and a method for driving the display panel; wherein the drive circuit includes a plurality of shift register groups including at least one shift register, and a clock signal input sub-circuit; the clock signal input sub-circuit is configured to input clock signals to respective shift registers in the plurality of shift register groups through a plurality of clock signal lines for controlling outputs of the respective shift registers, wherein durations of valid levels of clock signals applied to a same shift register group are same, and durations of valid levels of clock signals applied to different shift register groups are different.

16 Claims, 6 Drawing Sheets

Line1-800:

Line801-1600:

Line1601-2160:

Fig. 6

DRIVE CIRCUIT, DISPLAY PANEL, DISPLAY DEVICE, AND METHOD FOR DRIVING THE DISPLAY PANEL

CROSS-REFERENCE TO RELATED APPLICATION

This application claims the benefit of Chinese Patent Application No. 201811115436.X, filed with the Chinese Patent Office on Sep. 25, 2018, the content of which is hereby incorporated by reference in its entirety.

FIELD

This disclosure relates to the field of display technologies, and particularly to a drive circuit, a display panel, a display device, and a method for driving the display panel.

DESCRIPTION OF THE RELATED ART

As the display technologies are advancing rapidly, a display panel is evolving into be increasingly highly integrated at a lower cost. Wherein a Thin Film Transistor (TFT) gate drive circuit can be integrated on an array substrate of the display panel using a Gate Driver on Array (GOA) technology to drive scanning for the display panel so as to dispense with a wiring space of a bonding area and a fan-out area of a gate Integrated Circuit (IC), thus not only lowering both the material cost and the cost of a fabrication process of the product, but also providing the display panel with an aesthetically pleasing design including two symmetric sides and a narrow bezel thereof.

SUMMARY

Embodiments of the disclosure provide a drive circuit, a display panel, a display device, and a method for driving the display panel.

In one aspect, the embodiments of the disclosure provide a drive circuit including:

a plurality of shift register groups, each of which includes at least one shift register;

a plurality of gate lines corresponding to respective shift registers in the plurality of shift register groups in a one-to-one manner;

a plurality of clock signal lines connected with the respective shift registers, wherein a duration of a valid level of a scan signal input to each of the plurality of gate lines is same as durations of valid levels of corresponding clock signals of the plurality of clock signal lines for controlling outputs of the respective shift registers; and a clock signal input sub-circuit configured to input clock signals to the respective shift registers in the plurality of shift register groups through the plurality of clock signal lines for controlling the outputs of the respective shift registers, wherein durations of valid levels of clock signals applied to a same shift register group are same, and durations of valid levels of clock signals applied to different shift register groups are different.

In some embodiments, in the drive circuit above according to the embodiments of the disclosure, the clock signal input sub-circuit is configured to increase the durations of the valid levels of the clock signals applied to the different shift register groups successively in a transmission direction of the clock signals on the plurality of clock signal lines.

In some embodiments, in the drive circuit above according to the embodiments of the disclosure, the clock signal input sub-circuit is configured to increase the durations of the valid levels of the clock signals applied to the different shift register groups by a same increment successively in the transmission direction of the clock signals on the plurality of clock signal lines.

In some embodiments, in the drive circuit above according to the embodiments of the disclosure, numbers of shift registers in respective shift register groups are same.

In some embodiments, in the drive circuit above according to the embodiments of the disclosure, the plurality of shift register groups are arranged in an extension direction of the plurality of clock signal lines sequentially.

In another aspect, the embodiments of the disclosure further provide a display panel including the drive circuit, wherein the drive circuit includes:

a plurality of shift register groups, each of which includes at least one shift register;

a plurality of gate lines corresponding to respective shift registers in the plurality of shift register groups in a one-to-one manner;

a plurality of clock signal lines connected with the respective shift registers, wherein a duration of a valid level of a scan signal input to each of the plurality of gate lines is same as durations of valid levels of corresponding clock signals of the plurality of clock signal lines for controlling outputs of the respective shift registers; and a clock signal input sub-circuit configured to input clock signals to the respective shift registers in the plurality of shift register groups through the plurality of clock signal lines for controlling the outputs of the respective shift registers, wherein durations of valid levels of clock signals applied to a same shift register group are same, and durations of valid levels of clock signals applied to different shift register groups are different.

In some embodiments, in the display panel above according to the embodiments of the disclosure, the clock signal input sub-circuit is configured to increase the durations of the valid levels of the clock signals applied to the different shift register groups successively in a transmission direction of the clock signals on the plurality of clock signal lines.

In some embodiments, in the display panel above according to the embodiments of the disclosure, the clock signal input sub-circuit is configured to increase the durations of the valid levels of the clock signals applied to the different shift register groups by a same increment successively in the transmission direction of the clock signals on the plurality of clock signal lines.

In some embodiments, in the display panel above according to the embodiments of the disclosure, numbers of shift registers in respective shift register groups are same.

In some embodiments, in the display panel above according to the embodiments of the disclosure, the plurality of shift register groups are arranged in an extension direction of the plurality of clock signal lines sequentially.

In still another aspect, the embodiments of the disclosure further provide a display device including the display panel, the display panel includes a drive circuit, wherein the drive circuit includes:

a plurality of shift register groups, each of which includes at least one shift register;

a plurality of gate lines corresponding to respective shift registers in the plurality of shift register groups in a one-to-one manner;

a plurality of clock signal lines connected with the respective shift registers, wherein a duration of a valid level of a scan signal input to each of the plurality of gate lines is same as durations of valid levels of corresponding clock signals of the plurality of clock signal lines for controlling outputs of the respective shift registers; and a clock signal input sub-circuit configured to input clock signals to the respective shift registers in the plurality of shift register groups through the plurality of clock signal lines for controlling the outputs of the respective shift registers, wherein durations of valid levels of clock signals applied to a same shift register group are same, and durations of valid levels of clock signals applied to different shift register groups are different.

In some embodiments, in the display device above according to the embodiments of the disclosure, the clock signal input sub-circuit is configured to increase the durations of the valid levels of the clock signals applied to the different shift register groups successively in a transmission direction of the clock signals on the plurality of clock signal lines.

In some embodiments, in the display device above according to the embodiments of the disclosure, the clock signal input sub-circuit is configured to increase the durations of the valid levels of the clock signals applied to the different shift register groups by a same increment successively in the transmission direction of the clock signals on the plurality of clock signal lines.

In some embodiments, in the display device above according to the embodiments of the disclosure, numbers of shift registers in respective shift register groups are same.

In some embodiments, in the display device above according to the embodiments of the disclosure, the plurality of shift register groups are arranged in an extension direction of the plurality of clock signal lines sequentially.

In yet another aspect, the embodiments of the disclosure provide a method for driving the display panel above according to the embodiments of the disclosure, the method includes:

inputting clock signals to the respective shift registers in the plurality of shift register groups through the plurality of clock signal lines for controlling the outputs of the respective shift registers;

wherein durations of valid levels of clock signals applied to a same shift register group are same, and durations of valid levels of clock signals applied to different shift register groups are different.

In some embodiments, in the method above according to the embodiments of the disclosure, the durations of the valid levels of the clock signals applied to the different shift register groups increase successively in a transmission direction of the clock signals on the plurality of clock signal lines.

In some embodiments, in the method above according to the embodiments of the disclosure, the durations of the valid levels of the clock signals applied to the different shift register groups increase by a same increment successively in the transmission direction of the clock signals on the plurality of clock signal lines.

In some embodiments, in the method above according to the embodiments of the disclosure, numbers of shift registers in respective shift register groups are same.

In some embodiments, in the method above according to the embodiments of the disclosure, the plurality of shift register groups are arranged in an extension direction of the plurality of clock signal lines sequentially.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

Figure 1:
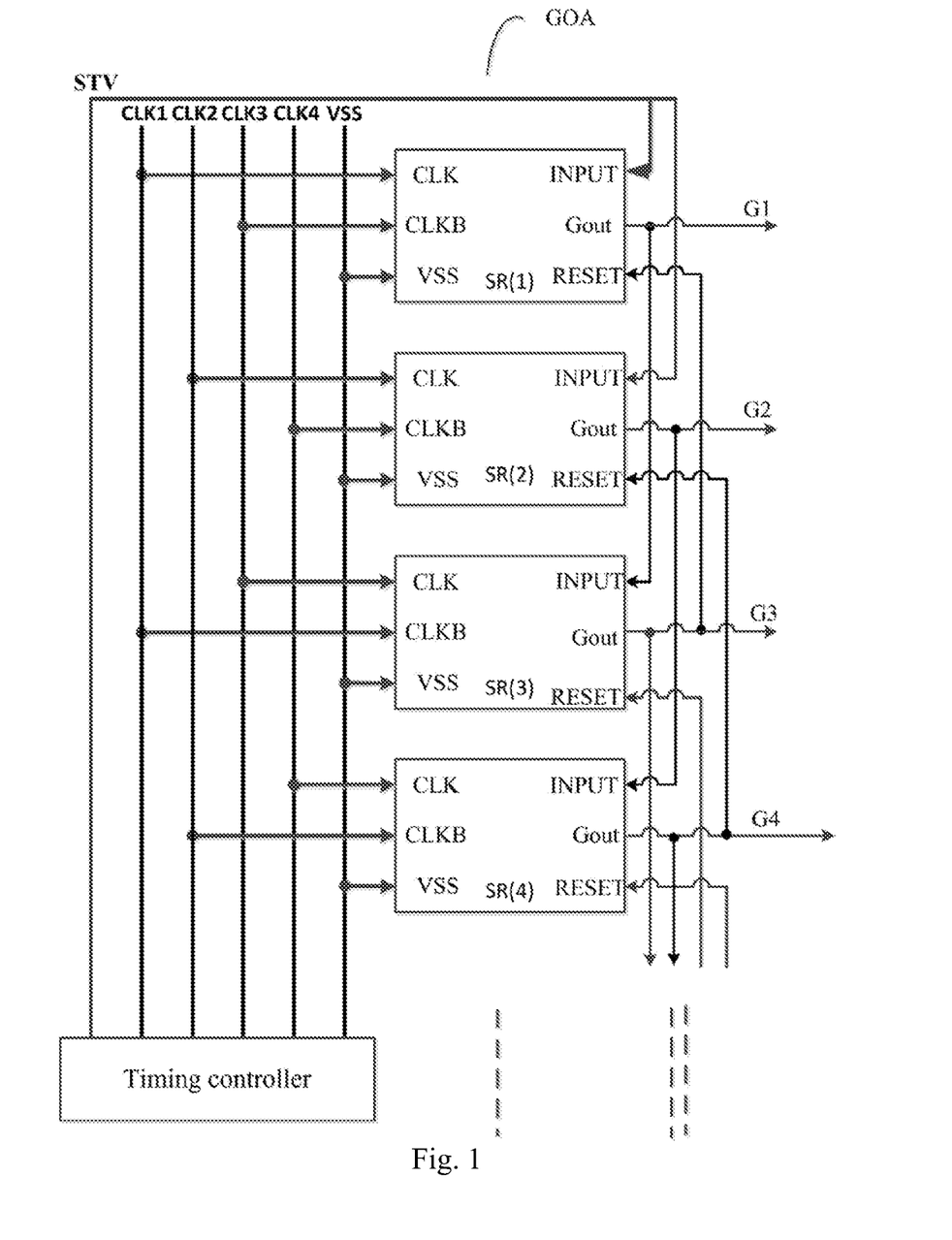
FIG. 1 is a schematic structural diagram of a display panel in the related art.
Figure 2:
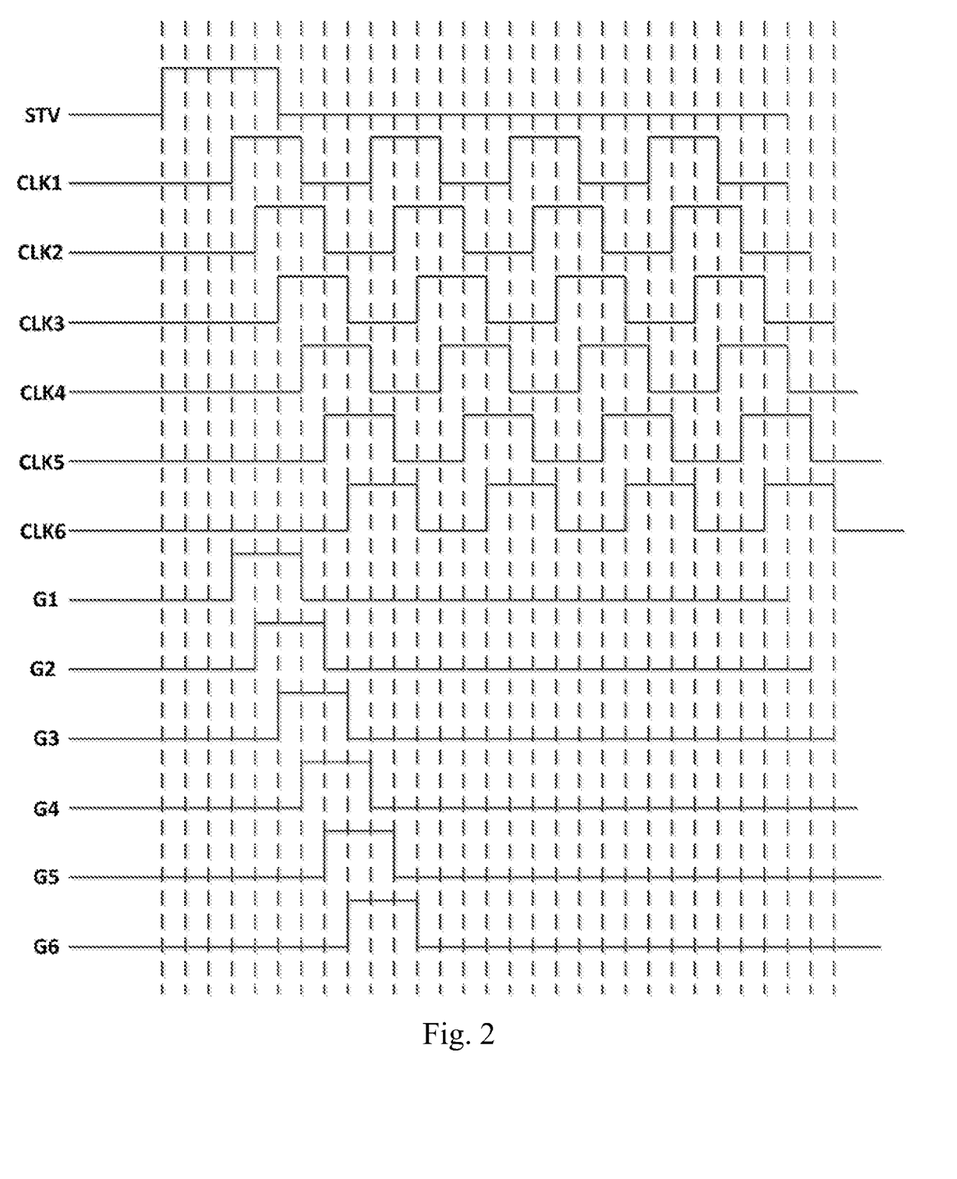
FIG. 2 is an input-output timing diagram corresponding to the display panel in the related art as illustrated in FIG. 1.

In the related art, as illustrated in FIG. 1 and FIG. 2, a display panel includes: N number of gate lines (G1, G2, G3, . . . ); a gate drive circuit GOA located on a side of the display panel, configured to scan respective rows of pixels, and connected with respective gate lines (G1, G2, G3, . . . ); and a timing controller connected with the gate drive circuit GOA, and configured to output sets of timing control signals, corresponding to respective shift registers in the gate drive circuit GOA in a one-to-one manner, to the respective shift registers in the gate drive circuit GOA, where each of the sets of timing control signals at least includes a frame trigger signal and a clock signal, widths of respective frame trigger signals in respective sets of timing control signals are same, a duration of a frame trigger signal can be equal to a half of a clock cycle of a clock signal, and the respective shift registers are configured to output scan signals to their corresponding gate lines under the control of their corresponding received sets of timing control signals.

Firstly, the first gate line G1 is enabled by both the first clock signal CLK1 and the frame trigger signal STV, an IC outputs data of the first row of the panel, and the first row is charged; the second gate line G2 is enabled by both the second clock signal CLK2, and the output of the first row, the IC outputs data of the second row of the panel, and the second row is charged; the third gate line G3 is enabled by both the third clock signal CLK3, and the output of the second row, the IC outputs data of the third row of the panel, and the third row is charged; the fourth gate line G4 is enabled by both the fourth clock signal CLK4, and the output of the third row, the IC outputs data of the fourth row of the panel, and the fourth row is charged; and so on until all the rows of the panel are scanned. FIG. 2 illustrates an input-output timing diagram corresponding to the display panel as illustrated in FIG. 1.

In the display panel above, with the GOA technology, the timing sequences of the first gate line to the last gate line are same, and the durations for charging the first gate line to the last gate line are same, so a distal end of the product designed using the GOA technology may be charged with a delay, thus resulting in a low ratio of charging the distal end.

In view of this, the embodiments of the disclosure provide a method for driving a display panel, a drive circuit, a display panel, and a display device so as to address the problem in the related art of a low ratio of charging the distal end.

Particular implementations of the method for driving the display panel, the drive circuit, the display panel, and the display device according to the embodiments of the disclosure will be described below in details with reference to the drawings.

Figure 3:
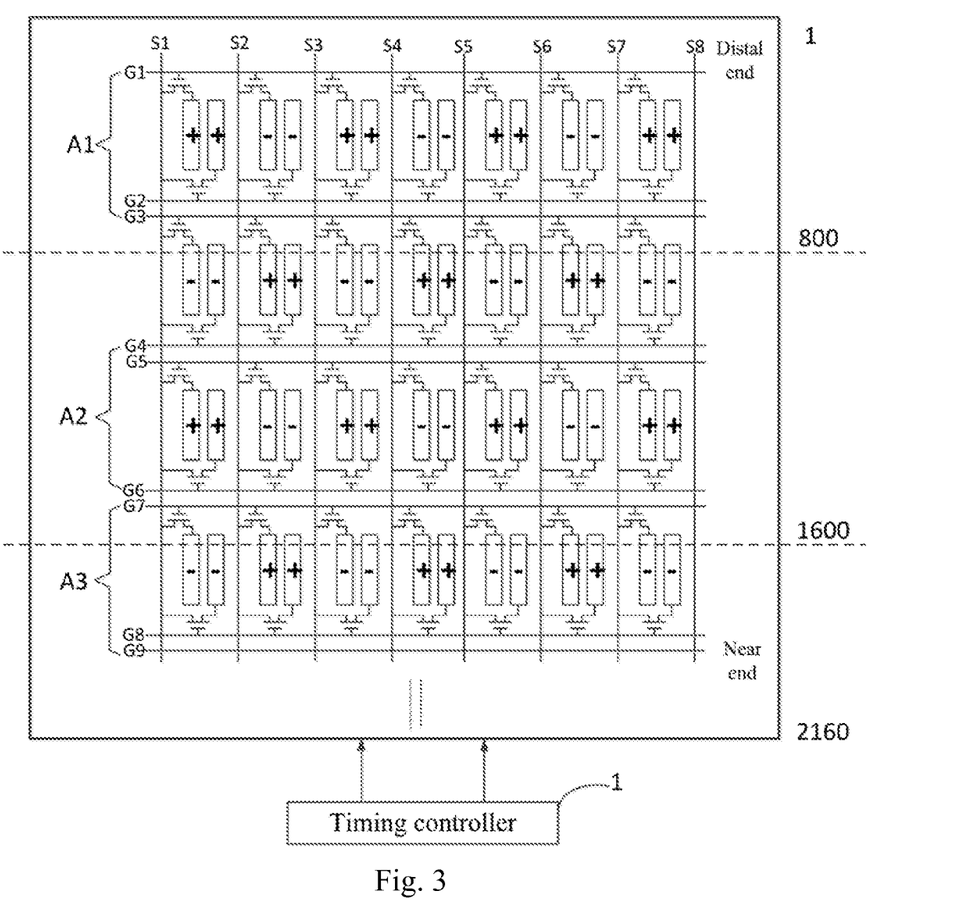
FIG. 3 is a schematic structural diagram of a display panel according to the embodiments of the disclosure.

The embodiments of the disclosure provide a method for driving a display panel, and as illustrated in FIG. 3, the display panel includes: a plurality of shift register groups, each of which includes at least one shift register (not illustrated); a plurality of gate lines (G1, G2, G3, . . . ) corresponding to respective shift registers in the plurality of shift register groups in a one-to-one manner, and a plurality of clock signal lines (arranged perpendicular to the plurality of gate lines, but not illustrated) connected with the respective shift registers, where a duration of a valid level of a scan signal input to each of the plurality of gate lines is same as durations of valid levels of corresponding clock signals of the plurality of clock signal lines for controlling outputs of the respective shift registers. Since the shift registers correspond to the gate lines in a one-to-one manner, the shift registers are divided into the plurality of shift register groups so that all the gate lines in the display panel are divided into a plurality of gate line groups, and for example, all the gate lines (G1, G2, G3, . . . ) in the display panel are divided into three groups A1, A2, and A3, where the group A1 to the group A3 are a distal end to a near end of the display panel from the perspective of a timing controller, and there are the same number of gate lines in each group. Further, for the sake of convenient understanding, 9 gate lines are illustrated, for example, in the embodiments of the disclosure; and of course, there may be a large number of gate lines in the display panel, and for example, there may be 2160 gate lines as illustrated in FIG. 3; where FIG. 3 further illustrates a timing controller 1 connected with the respective shift registers, and configured to output sets of timing control signals corresponding to the respective shift registers in a one-to-one manner.

The driving method includes: inputting clock signals to the respective shift registers in the plurality of shift register groups through the plurality of clock signal lines for controlling the outputs of the respective shift registers, where durations of valid levels of clock signals applied to a same shift register group are same, and durations of valid levels of clock signals applied to different shift register groups are different.

Figure 4:
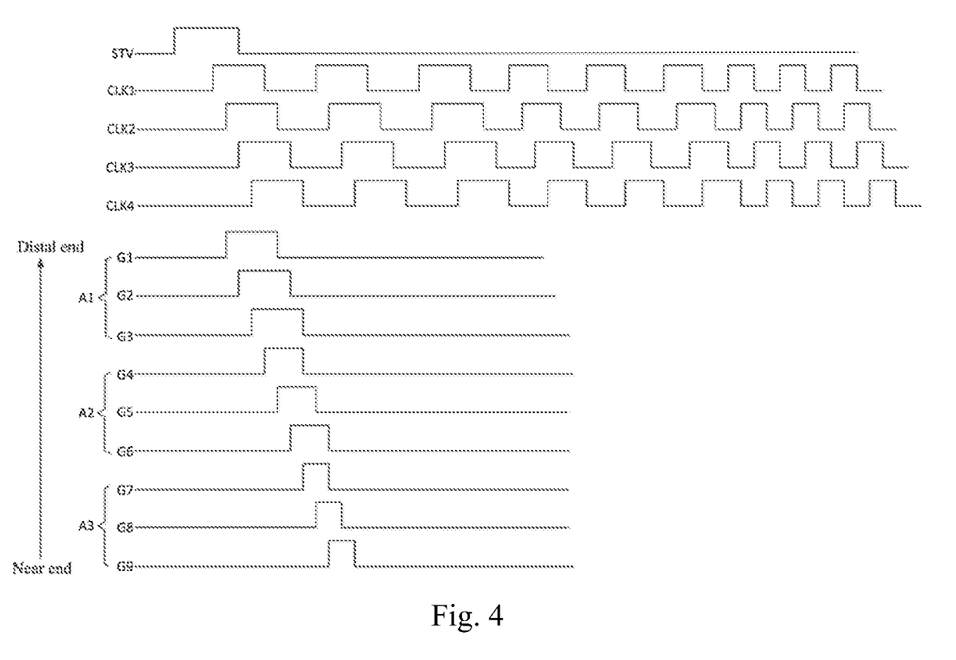
FIG. 4 is a first input-output timing diagram corresponding to the display panel according to the embodiments of the disclosure as illustrated in FIG. 3.

In some embodiments, FIG. 4 illustrates a timing diagram corresponding to FIG. 3, and since scan signals input to respective gate lines in the display panel correspond to sets of clock signals of the plurality of clock signal lines for controlling the outputs of the respective shift registers in a one-to-one manner, a duration of a valid level of a scan signal of each gate line is consistent with pulse widths of corresponding clock signals of the plurality of clock signal lines for controlling the outputs of the respective shift registers, and as can be apparent from FIG. 4, durations of valid levels of clock signals applied to different shift register groups are different, for example, can increase successively, from the near end (A3) of the display panel to the distal end (A1) thereof, thus the durations for charging the gate lines can increase successively from the near end (A3) of the display panel to the distal end (A1) thereof.

In the method above for driving the display panel according to the embodiments of the disclosure, since scan signals input to respective gate lines in the display panel correspond to sets of clock signals of the plurality of clock signal lines for controlling the outputs of the respective shift registers in a one-to-one manner, with reference to the transmission direction of the clock signals, in order to increase a duration of a valid level of a scan signal to a gate line at the distal end of the display panel, a duration of a valid level of a clock signal, corresponding to the gate line, of the plurality of clock signal lines for controlling the outputs of the respective shift registers may be increased, so in the embodiments of the disclosure, all the shift registers are divided into the plurality of shift register groups, and clock signals are input to the respective shift registers in the plurality of shift register groups through the plurality of clock signal lines for controlling the outputs of the respective shift registers, where durations of valid levels of clock signals applied to the same shift register group are same, and durations of valid levels of clock signals applied to different shift register groups in the transmission direction of the clock signals on the clock signal lines are different, thus addressing the problem that a gate line at the distal end of the display panel may be charged with a delay, and thus there may be a low ratio of charging the gate line at the distal end. Moreover, in the related art, charging periods of time of the respective gate lines may overlap with each other due to a delay in charging so that a gate line may be charged improperly at an overlapping charging point of time thereof with that of another gate line, so in the embodiments of the disclosure, a width of a charging period of time of a gate line may be adjusted moderately to thereby avoid the charging period of time thereof from overlapping with that of the other gate line, thus accordingly, in the embodiments of the disclosure, the display uniformity of the display panel can be improved to thereby improve the display effect of an image while lowering the risk of an occurring bad display.

Figure 5A:
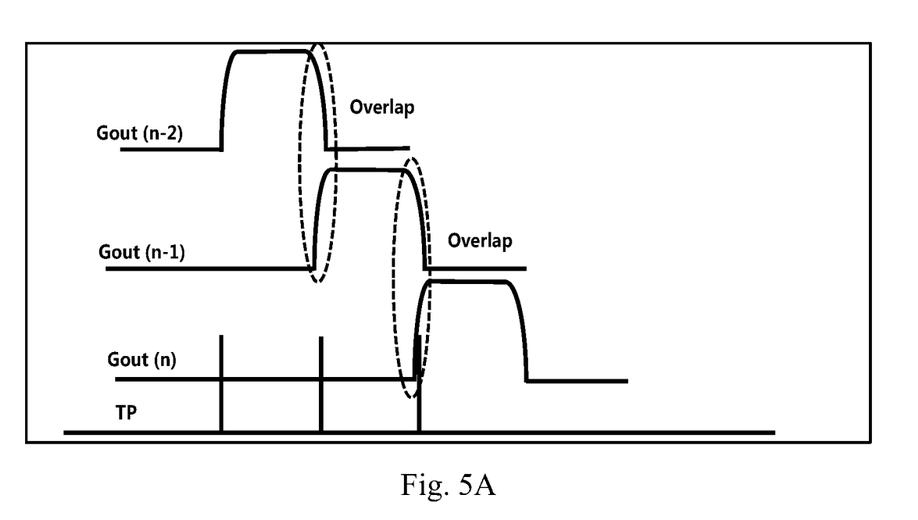
FIG. 5A is an input-output timing diagram corresponding to the display panel in the related art.
Figure 5B:
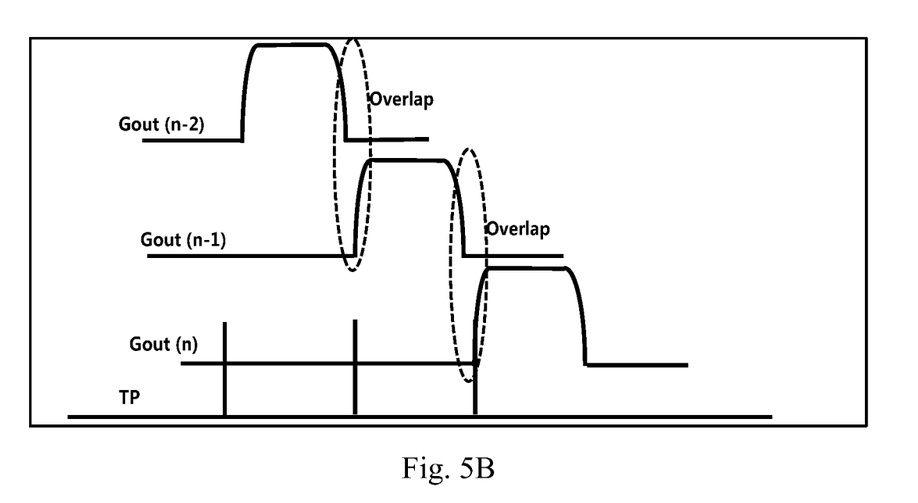
FIG. 5B is a second input-output timing diagram corresponding to the display panel according to the embodiments of the disclosure as illustrated in FIG. 3.

In some embodiments, as illustrated in FIG. 5A and FIG. 5B, where FIG. 5A is a schematic diagram of overlapping charging periods of time of adjacent gate lines in the related art, there is a delay of a scan signal input to a gate line at the distal end of the display panel, thus there is a delay of a corresponding output Gout at the distal end, in the related art. For example, gate lines G(n−2), G(n−1), and G(n) at the distal end of the display panel are arranged away from the near end in that order, and since there is a delay of an output Gout(n−2) of the gate line G(n−2), there is an output Gout(n−1) of the gate line G(n−1) before the end of the output Gout(n−2), and alike, there is an output Gout(n) of the gate line G(n) before the end of Gout(n−1), so the outputs of the gate lines of adjacent rows may overlap with each other (as denoted in dotted circles). FIG. 5B is a schematic diagram of charging the gate lines of the display panel using the driving method above according to the embodiments of the disclosure, and in the embodiments of the disclosure, since there is a longer duration of a valid level for charging a gate line at the distal end, the problem of a delay in charging the distal end can be addressed moderately, that is, in the embodiments of the disclosure, a normal output at the distal end can be guaranteed to thereby avoid the outputs of the gate lines of the adjacent rows from overlapping with each other. As can be apparent from FIG. 5B, the charging periods of time of the adjacent gate lines do not overlap with each other, thus resulting in their normal outputs, so in the embodiments of the disclosure, the widths of the charging periods of time of the gate lines can be adjusted moderately to thereby avoid their charging periods of time at the distal end from overlapping with each other.

In some embodiments, in the driving method above according to the embodiments of the disclosure, in the transmission direction of the clock signals on the plurality of clock signal lines, i.e., a direction from the near end of the display panel to the distal end thereof, durations of valid levels of clock signals applied to different shift register groups can increase from the near end of the display panel to the distal end thereof successively to thereby address the problem that a gate line at the distal end of the display panel may be charged with a delay, and thus there may be a low ratio of charging the gate line at the distal end.

Figure 6:
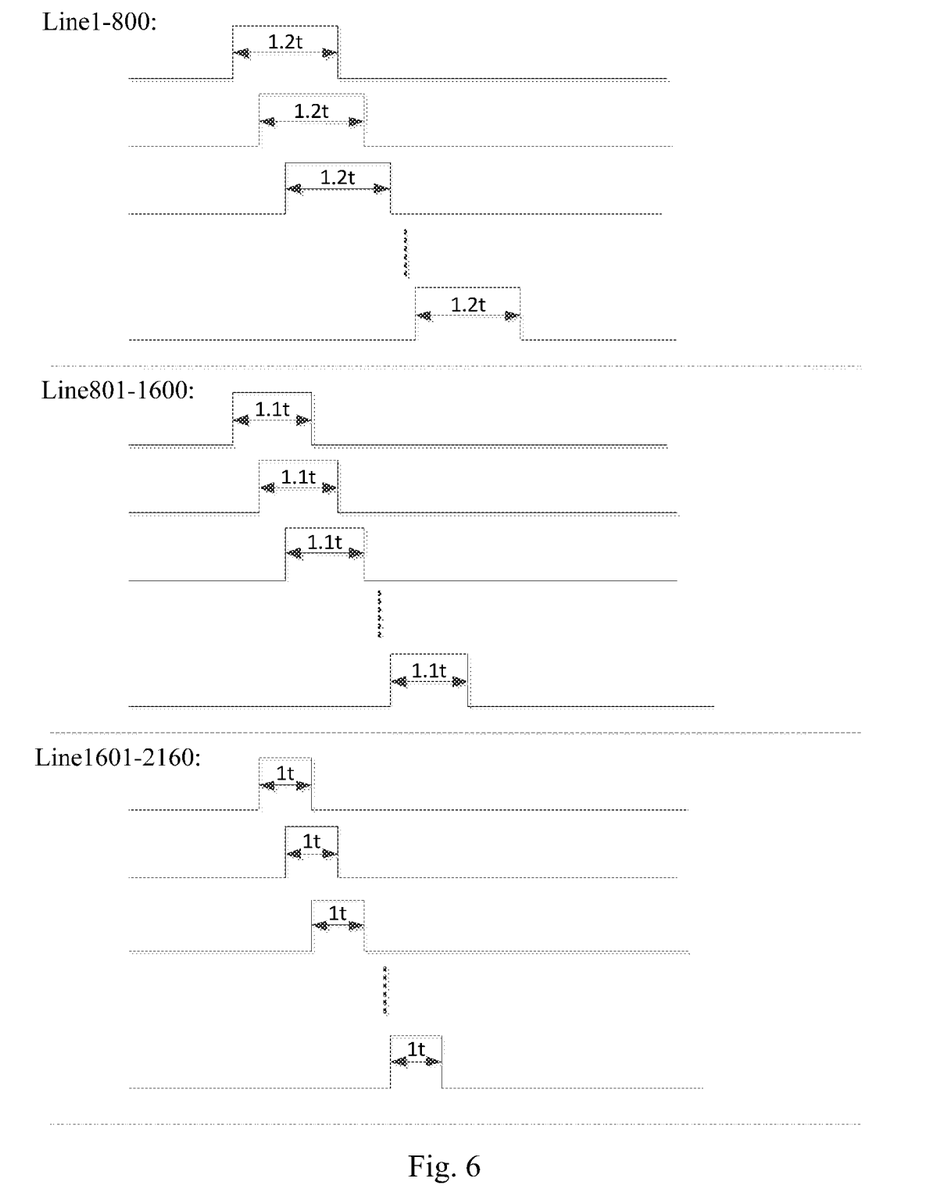
FIG. 6 is a schematic diagram of durations of valid levels of scan signals corresponding to gate lines of the display panel according to the embodiments of the disclosure as illustrated in FIG. 3.

In some embodiments, in the driving method above according to the embodiments of the disclosure, in the transmission direction of the clock signals on the plurality of clock signal lines, i.e., the direction from the near end of the display panel to the distal end thereof, durations of valid levels of clock signals applied to different shift register groups increase by the same increment successively, that is, durations for charging gate line groups corresponding to the different shift register groups increase by the same increment successively. FIG. 6 illustrates a schematic diagram of 2160 gate lines in total from the near end of the display panel to the distal end thereof, all of which are divided into three groups including a group Lines 1-800 of gate lines 1 to 800, a group Lines 801-1600 of gate lines 801 to 1600, and a group Lines 1601-2160 of gate lines 1601 to 2160. For example, a duration (a duration of a valid level) for charging each gate line in the gate line group Lines 1-800 at the distal end is 1.2 t, a duration for charging each gate line in the gate line group Lines 801-1600 at the middle is 1.1 t, and a duration for charging each gate line in the gate line group Lines 1601-2160 at the near end is 1 t, where t can represent an original pulse width of a clock signal output by the timing controller in the related art; and a duration for charging each gate line corresponds to a pulse width of a corresponding clock signal, that is, durations of valid levels of clock signals applied to different shift register groups increase successively from the near end of the display panel to the distal end thereof, thus addressing the problem that a gate line at the distal end of the display panel may be charged with a delay, and thus there may be a low ratio of charging the gate line at the distal end.

In some embodiments, in the driving method above according to the embodiments of the disclosure, in order to group the gate lines conveniently, numbers of shift registers in the respective shift register groups are same. Of course, in a practical implementation, numbers of shift registers in the respective shift register groups may be different.

In some embodiments, in the driving method above according to the embodiments of the disclosure, as illustrated in FIG. 3 and FIG. 4, the respective shift register groups (e.g., the three groups A1, A2, and A3 in the embodiments of the disclosure) are arranged in an extension direction of the plurality of clock signal lines sequentially.

In some embodiments, in the driving method above according to the embodiments of the disclosure, each shift register is connected with a corresponding one of the plurality of gate lines, so the number of shift registers in the drive circuit can be determined and all the shift registers in the drive circuit can be divided into the plurality of shift register groups, according to the number of the plurality of gate lines.

Based upon the same inventive idea, the embodiments of the disclosure further provide a drive circuit. The drive circuit includes: a plurality of shift register groups, each of which includes at least one shift register; a plurality of gate lines corresponding to respective shift registers in the plurality of shift register groups in a one-to-one manner; a plurality of clock signal lines connected with the respective shift registers, where a duration of a valid level of a scan signal input to each of the plurality of gate lines is same as durations of valid levels of corresponding clock signals of the plurality of clock signal lines for controlling outputs of the respective shift registers; and a clock signal input sub-circuit configured to input clock signals to the respective shift registers in the plurality of shift register groups through the plurality of clock signal lines for controlling the outputs of the respective shift registers, where durations of valid levels of clock signals applied to the same shift register group are same, and durations of valid levels of clock signals applied to different shift register groups are different.

In the drive circuit above according to the embodiments of the disclosure, the clock signal input sub-circuit inputs the clock signals to the respective shift registers in the plurality of shift register groups through the plurality of clock signal lines, where durations of valid levels of clock signals applied to the same shift register group are same, and durations of valid levels of clock signals applied to different shift register groups are different, thus addressing the problem that a gate line at the distal end of the display panel may be charged with a delay, and thus there may be a low ratio of charging the gate line at the distal end.

In some embodiments, in the drive circuit above according to the embodiments of the disclosure, the clock signal input sub-circuit is configured to increase the durations of the valid levels of the clock signals applied to the different shift register groups successively in a transmission direction of the clock signals on the plurality of clock signal lines, thus addressing the problem that a gate line at the distal end of the display panel may be charged with a delay, and thus there may be a low ratio of charging the gate line at the distal end.

In some embodiments, in the drive circuit above according to the embodiments of the disclosure, the clock signal input sub-circuit is configured to increase the durations of the valid levels of the clock signals applied to the different shift register groups by the same increment successively in the transmission direction of the clock signals on the plurality of clock signal lines.

In some embodiments, in the drive circuit above according to the embodiments of the disclosure, the clock signal input sub-circuit can be located in a timing controller.

In some embodiments, in the drive circuit above according to the embodiments of the disclosure, the number of shift registers in the drive circuit is determined and thus all the shift registers are divided into the plurality of shift register groups, according to the number of gate lines determined using a counter within the timing controller. For example, there are 2160 gate lines in total from the distal end of the display panel to the near end thereof as counted by the counter, a pulse width of each clock signal output by the clock signal input sub-circuit in the timing controller for the gate lines 1601 to 2160 at the near end is an original pulse width 1 t, a pulse width of each clock signal output by the clock signal input sub-circuit in the timing controller for the gate lines 801 to 1600 at the middle is increased to 1.1 t, and a pulse width of each clock signal output by the clock signal input sub-circuit in the timing controller for the gate lines 1 to 800 at the distal end is increased to 1.2 t, where t represents the original pulse width of a clock signal output by the timing controller in the related art, thus addressing the problem that a gate line at the distal end of the display panel may be charged with a delay, and thus there may be a low ratio of charging the gate line at the distal end.

Based upon the same inventive idea, the embodiments of the disclosure further provide a display panel including the drive circuit according to any one of the embodiments of the disclosure. Reference can be made to the embodiments of the drive circuit above for an implementation of the display panel, so a repeated description thereof will be omitted here.

Furthermore, the display panel above according to the embodiments of the disclosure can be a liquid crystal display panel or an organic light-emitting display panel, although the embodiments of the disclosure will not be limited thereto.

Based upon the same inventive idea, the embodiments of the disclosure further provide a display device including the display panel above according to the embodiments of the disclosure. The display device can be a mobile phone, a tablet computer, a TV set, a monitor, a notebook computer, a digital photo frame, a navigator, or any other product or component with a display function. Reference can be made to the embodiments of the display panel above for an implementation of the display device, so a repeated description thereof will be omitted here.

In the method for driving a display panel, the drive circuit, the display panel, and the display device according to the embodiments of the disclosure, since scan signals input to respective gate lines in the display panel correspond to sets of clock signals of the plurality of clock signal lines for controlling the outputs of the respective shift registers in a one-to-one manner, with reference to the transmission direction of the clock signals, in order to increase a duration of a valid level of a scan signal to a gate line at the distal end of the display panel, a duration of a valid level of a clock signal, corresponding to the gate line, of the plurality of clock signal lines for controlling the outputs of the respective shift registers may be increased, so in the embodiments of the disclosure, all the shift registers are divided into the plurality of shift register groups, and clock signals are input to the respective shift registers in the plurality of shift register groups through the plurality of clock signal lines for controlling the outputs of the respective shift registers, where durations of valid levels of clock signals applied to the same shift register group are same, and durations of valid levels of clock signals applied to different shift register groups in the transmission direction of the clock signals on the clock signal lines are different, thus addressing the problem that a gate line at the distal end of the display panel may be charged with a delay, and thus there may be a low ratio of charging the gate line at the distal end. Moreover, in the related art, charging periods of time of the respective gate lines may overlap with each other due to a delay in charging so that a gate line may be charged improperly at an overlapping charging point of time thereof with that of another gate line, so in the embodiments of the disclosure, a width of a charging period of time of a gate line may be adjusted moderately to thereby avoid the charging period of time thereof from overlapping with that of the other gate line, thus in the embodiments of the disclosure, the display uniformity of the display panel can be improved to thereby improve the display effect of an image while lowering the risk of an occurring bad display.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A drive circuit, comprising:
   a plurality of shift register groups, each of which comprises at least one shift register;
   a plurality of gate lines corresponding to respective shift registers in the plurality of shift register groups in a one-to-one manner;
   a plurality of clock signal lines connected with the respective shift registers, wherein a duration of a valid level of a scan signal input to each of the plurality of gate lines is same as durations of valid levels of corresponding clock signals of the plurality of clock signal lines for controlling outputs of the respective shift registers; and
   a clock signal input sub-circuit configured to input clock signals to the respective shift registers in the plurality of shift register groups through the plurality of clock signal lines for controlling the outputs of the respective shift registers, wherein durations of valid levels of clock signals applied to a same shift register group are same, and durations of valid levels of clock signals applied to different shift register groups are different;
   wherein the clock signal input sub-circuit is configured to increase the durations of the valid levels of the clock signals applied to the different shift register groups successively in a transmission direction of the clock signals on the plurality of clock signal lines.

2. The drive circuit according to claim 1, wherein the clock signal input sub-circuit is configured to increase the durations of the valid levels of the clock signals applied to the different shift register groups by a same increment successively in the transmission direction of the clock signals on the plurality of clock signal lines.

3. The drive circuit according to claim 1, wherein numbers of shift registers in respective shift register groups are same.

4. The drive circuit according to claim 1, wherein the plurality of shift register groups are arranged in an extension direction of the plurality of clock signal lines sequentially.

5. A display panel, comprising a drive circuit, wherein the drive circuit comprises:
   a plurality of shift register groups, each of which comprises at least one shift register;
   a plurality of gate lines corresponding to respective shift registers in the plurality of shift register groups in a one-to-one manner;
   a plurality of clock signal lines connected with the respective shift registers, wherein a duration of a valid level of a scan signal input to each of the plurality of gate lines is same as durations of valid levels of corresponding clock signals of the plurality of clock signal lines for controlling outputs of the respective shift registers; and
   a clock signal input sub-circuit configured to input clock signals to the respective shift registers in the plurality of shift register groups through the plurality of clock signal lines for controlling the outputs of the respective shift registers, wherein durations of valid levels of clock signals applied to a same shift register group are same, and durations of valid levels of clock signals applied to different shift register groups are different;
   wherein the clock signal input sub-circuit is configured to increase the durations of the valid levels of the clock signals applied to the different shift register groups successively in a transmission direction of the clock signals on the plurality of clock signal lines.

6. The display panel according to claim 5, wherein the clock signal input sub-circuit is configured to increase the durations of the valid levels of the clock signals applied to the different shift register groups by a same increment successively in the transmission direction of the clock signals on the plurality of clock signal lines.

7. The display panel according to claim 5, wherein numbers of shift registers in respective shift register groups are same.

8. The display panel according to claim 5, wherein the plurality of shift register groups are arranged in an extension direction of the plurality of clock signal lines sequentially.

9. A display device, comprising a display panel, the display panel comprises a drive circuit, wherein the drive circuit comprises:
   a plurality of shift register groups, each of which comprises at least one shift register;
   a plurality of gate lines corresponding to respective shift registers in the plurality of shift register groups in a one-to-one manner;
   a plurality of clock signal lines connected with the respective shift registers, wherein a duration of a valid level of a scan signal input to each of the plurality of gate lines is same as durations of valid levels of corresponding clock signals of the plurality of clock signal lines for controlling outputs of the respective shift registers; and
   a clock signal input sub-circuit configured to input clock signals to the respective shift registers in the plurality of shift register groups through the plurality of clock signal lines for controlling the outputs of the respective shift registers, wherein durations of valid levels of clock signals applied to a same shift register group are same, and durations of valid levels of clock signals applied to different shift register groups are different;
   wherein the clock signal input sub-circuit is configured to increase the durations of the valid levels of the clock signals applied to the different shift register groups successively in a transmission direction of the clock signals on the plurality of clock signal lines.

10. The display device according to claim 9, wherein the clock signal input sub-circuit is configured to increase the durations of the valid levels of the clock signals applied to the different shift register groups by a same increment successively in the transmission direction of the clock signals on the plurality of clock signal lines.

11. The display device according to claim 9, wherein numbers of shift registers in respective shift register groups are same.

12. The display device according to claim 9, wherein the plurality of shift register groups are arranged in an extension direction of the plurality of clock signal lines sequentially.

13. A method for driving the display panel according to claim 5, wherein the method comprises:
   inputting clock signals to the respective shift registers in the plurality of shift register groups through the plurality of clock signal lines for controlling the outputs of the respective shift registers;
   wherein durations of valid levels of clock signals applied to a same shift register group are same, and durations of valid levels of clock signals applied to different shift register groups are different;
   wherein the durations of the valid levels of the clock signals applied to the different shift register groups increase successively in a transmission direction of the clock signals on the plurality of clock signal lines.

14. The method according to claim 13, wherein the durations of the valid levels of the clock signals applied to the different shift register groups increase by a same increment successively in the transmission direction of the clock signals on the plurality of clock signal lines.

15. The method according to claim 13, wherein numbers of shift registers in respective shift register groups are same.

16. The method according to claim 13, wherein the plurality of shift register groups are arranged in an extension direction of the plurality of clock signal lines sequentially.

* * * * *